E. J. RETZBACH.
BOX FOR ICE CREAM AND THE LIKE.
APPLICATION FILED MAY 21, 1914.
1,180,188.
Patented Apr. 18, 1916.
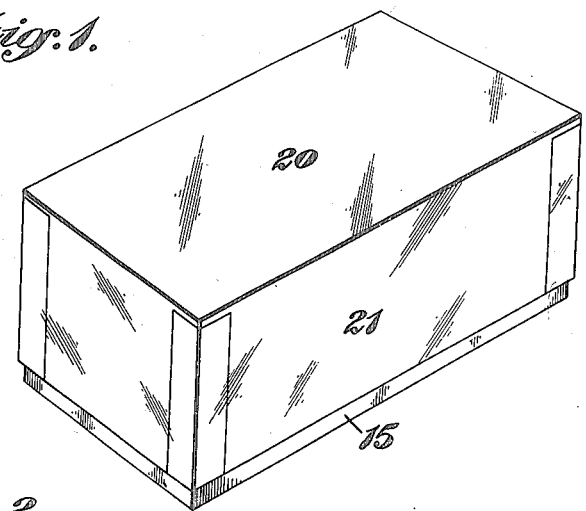
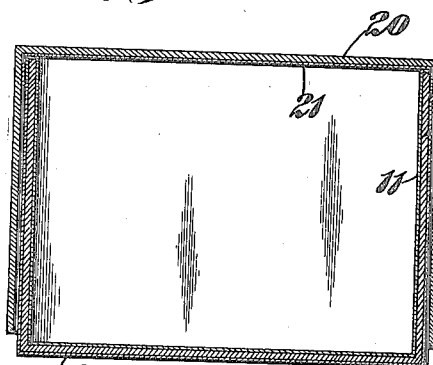
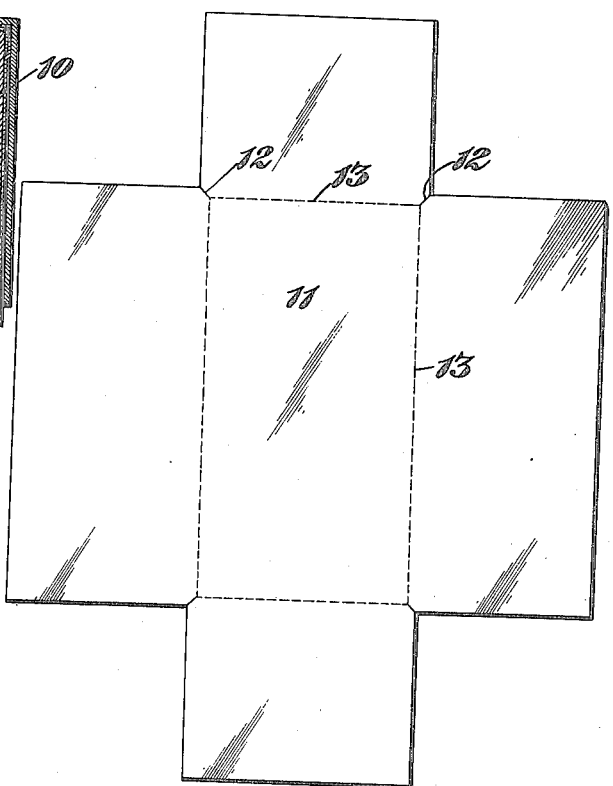

UNITED STATES PATENT OFFICE.

EDWARD J. RETZBACH, OF ST. LOUIS, MISSOURI.

BOX FOR ICE-CREAM AND THE LIKE.

1,180,188.   Specification of Letters Patent.   Patented Apr. 18, 1916.

Application filed May 21, 1914. Serial No. 839,981.

*To all whom it may concern:*

Be it known that I, EDWARD J. RETZBACH, a citizen of the United States, and residing at St. Louis, in the State of Missouri, have invented certain new and useful Improvements in Boxes for Ice-Cream and the like, of which the following is a specification.

This invention relates to boxes or packages for ice cream and the like, and more particularly, for brick ice cream.

In the manufacture of brick ice cream, in accordance with the method now employed by me, and utilizing the Retzbach ice cream bricking machine, the ice cream is placed in a box in a semi-frozen condition, and the box of semi-frozen ice cream is then placed in a freezer and frozen to the desired hardness or consistency. Where an ordinary ice cream box is used, it often occurs that the surface in contact with the warm box will melt. When the filled box is then subsequently placed in a freezer, an icy coating is formed on the surfaces next to the walls, which is objectionable. On the other hand, if such an icy coating is not formed on the surfaces, then the molten surfaces of the brick will not only detract from its appearance, but also detract from its palatability in that it destroys the velvety spongy nature which is so desirable.

Ice cream has a tendency to stick to the container in which it is placed. This is objectionable where the brick is to be cut up and served in pieces, and requires the use of a separate wrapper, which must, however, be removed after the brick is taken out of the box.

Some of the objects of this invention, therefore, are to provide an ice cream box which will keep the ice cream, prior to, during, or after freezing, in a uniform velvety condition, and which will avoid both the formation of an icy coating or a molten surface.

Another object is, to provide an ice cream box which is so constructed that, while the brick is wrapped in a liner, this liner is a part of the box and is attached thereto in such a manner that the ice cream brick can be readily removed from the box without sticking.

Other objects are, to provide an ice cream box which is simple in construction, cheap to manufacture and durable.

Further objects will appear from the detail description taken in connection with the accompanying drawing, in which:

Figure 1 is a perspective view of an ice cream box embodying this invention, Fig. 2 is a transverse section, Fig. 3 is an enlarged detail section of Fig. 2, and, Fig. 4 is a development of the liner.

Referring to the accompanying drawing, 10 designates the body of the box, which is made of an absorbent cardboard. This body is provided with an inside liner 11, which is formed of a single sheet, as shown in Fig. 4, the corners being slit, as shown at 12, so that, when the liner is folded on the dotted lines 13, the edges of the flap portions of the liner will fold one over the other so as to form a practically uninterrupted inside surface. This liner is made of a porous paper, and, preferably, of a vegetable parchment paper, or any other porous and sanitary paper having a smooth surface free from nap or fuzz. The outside surface of the body 10 is coated with a waterproof coating 14 of shellac or collodion, and outside of this waterproof coating is placed a covering or wrapper 15 of waterproof paper, this wrapper being placed thereon when the shellac or collodion is still wet, or the coating is dried and the wrapper pasted on, so as to be evenly attached thereto at all points. The inside liner 11 is entirely loose and lies loosely against the inside surface of the body 10. The outside edges of the flap portions of the liner are, however, turned or folded over the upper edge of the box body and against the outside surface, as shown at 16, and the upper edge 17 of the wrapper 15 is laid over this turned edge 16, as shown in Fig. 3. The edge 16 is turned over the coating 14 while this is still soft, and a shellac or collodion coating 18 is also placed between the edges 16 and 17. A cover 20, having sides 21 telescoping with the box, is provided with a loose liner of vegetable parchment paper 22, which is arranged to lie on top of the brick.

When the box is filled with ice cream and closed, the sanitary porous paper lining 11 will absorb any melted ice cream on the surface of the brick, and since this liner lies loosely against the inside faces of the absorbent cardboard body 10 without any intervening glue, this body will also absorb the melted surface ice cream. In view of the fact, therefore, that the melted surface ice cream is continually absorbed by the liner and the body, not alone is the formation of an icy coating prevented, but the surface of the brick remains spongy and velvety, so that there is a uniform freezing through the entire brick. The waterproof coatings 14 and 15 perform the useful function in not only preventing the entrance of outside air, moisture and heat, but also prevent the ice cream from soaking through and rendering the entire box flabby and wet. The box will, in fact, keep its shape, and will be dry on the outside.

It will be noted that the liner is attached only at its upper edges to the upper edges of the box, leaving the entire remaining part of the liner in the box loose. This construction, in addition to the advantages pointed out above, has the additional advantageous function of permitting the brick to be readily removed from the box. If, after the removal of the cover, the box is inverted and shaken, the liner will come out with the brick, but, in view of the fact that this liner is attached to the box at its outside edges only, the liner will peel off of the brick as it comes out of the box, and this peeling off of the liner is a gradual operation, so that the brick, as it leaves the box, will be clean.

It is obvious that various changes may be made in details of construction without departing from the spirit of this invention, and it is to be understood, therefore, that this invention is not to be limited to the specific construction shown and described.

Having thus described the invention, what is claimed is:

1. An ice cream box having a body and a liner for the inside surfaces thereof, both the body and liner being pervious to, and adapted to absorb, moisture emanating from within the box, the liner being wholly and permanently free from surface nap or fuzz and attached to the body at the upper edges only.

2. A box having a body, and a loose inside liner for the inside surfaces of the body, said liner being attached to the body at the upper edges only, whereby the body of the liner is adapted to turn inside out and peel from the contents when the contents and the box are separated.

3. A box having a body, and a loose liner for the inside surfaces of the body, said liner being slit at the lateral corners of the box and attached to the body at the upper edges only, whereby the body of the liner is adapted to turn inside out and peel from the contents when the contents and the box are separated.

4. A box having a body, and a loose liner for the inside surfaces of the body, the upper edges of the liner being folded outwardly over the edges of the body and attached to the outer face of the body at the upper edges, whereby the body of the liner is adapted to turn inside out and peel from the contents when the contents and the box are separated.

5. An ice cream box having an absorbent body, an inside porous parchment liner for the inside surfaces of the body, the upper edges of said liner being folded outwardly over the edges of the body and attached to the outside surfaces of the body only, whereby the body of the liner is adapted to turn inside out and peel from the contents when the contents and box are separated.

In testimony whereof I affix my signature in the presence of these two witnesses.

EDWARD J. RETZBACH.

Witnesses:
J. H. BRUNINGA,
HENRY S. COOKE.